United States Patent [19]
Bedford et al.

[11] Patent Number: 5,441,034
[45] Date of Patent: Aug. 15, 1995

[54] STEAM GENERATOR HEAT EXCHANGER FOR COOKING EQUIPMENT

[75] Inventors: James P. Bedford, Willoughby, Ohio; Wayne S. Hollingshead, Guelph, Canada

[73] Assignee: Cleveland Range, Inc., Cleveland, Ohio

[21] Appl. No.: 246,257

[22] Filed: May 19, 1994

[51] Int. Cl.6 .......................... A47J 27/04; A21B 1/08
[52] U.S. Cl. .......................................... 126/20; 99/330; 99/467; 126/348; 126/369; 219/401
[58] Field of Search ................. 99/330, 467, 473–476, 99/483; 126/20, 20.1, 20.2, 348, 369, 369.1–369.3, 377, 378; 219/401, 400; 392/394–401

[56] References Cited

U.S. PATENT DOCUMENTS

| | | | |
|---|---|---|---|
| 3,604,895 | 9/1971 | MacKay | 219/401 |
| 3,639,725 | 2/1972 | Maniscalo | 219/401 |
| 3,744,474 | 7/1973 | Shaw | 99/330 |
| 4,460,822 | 7/1984 | Alden et al. | 126/369 |
| 4,506,598 | 3/1985 | Meister | 99/330 |
| 4,655,192 | 4/1987 | Jovanovic | 99/467 |
| 5,103,800 | 4/1992 | Bedford et al. | 126/20 |
| 5,158,064 | 10/1992 | Willis et al. | 126/20 |
| 5,161,518 | 11/1992 | Bedford | 126/348 |
| 5,279,212 | 1/1994 | Coupe | 99/330 |
| 5,301,652 | 4/1994 | Willis et al. | 126/20 |

*Primary Examiner*—Timothy F. Simone
*Attorney, Agent, or Firm*—Standley & Gilcrest

[57] ABSTRACT

A steam cooking device is described which contains a steam generating chamber having a heat exchanger therein. The heat exchanger is provided with baffles comprised of raised surface projections to create turbulent flow of flue gases through the heat exchanger which results in more efficient heating of the water in the steam generator chamber to create steam for use in cooking.

7 Claims, 3 Drawing Sheets

STEAM GENERATOR HEAT EXCHANGER FOR COOKING EQUIPMENT

BACKGROUND AND SUMMARY OF THE INVENTION

The present invention relates to steam cooking devices, and more particularly, to an internal flue baffle/heat exchanger for use in such cooking devices.

The advantages of steaming certain foods rather than cooking these foods by other methods have become well recognized in recent years. For example, when meats are cooked under dry conditions, as when baked, the meat looses its intrinsic moisture and may become dried out and unpalatable. Further, vegetables contain certain valuable minerals which are retained if the vegetables are steamed rather than cooked by other means, such as boiling.

Current steam cooking devices utilize steam generated in a boiler to cook or thaw food. This steam is transported from the boiler to a cooking chamber where it is introduced into the cooking chamber by a conduit or the like extending from the boiler to an opening in the wall of the cooking chamber. The boiler, or steam generator, has included therein, a heat exchanger for conveying the heat from a flue gas region of the heat exchanger to the water just outside of the flue gas region, which causes the water to turn to steam. As heating efficiency within the heat exchanger increases, several beneficial results occur with the performance of the cooking device. For example, less gas may be used for creating the flame which heats the water. The steam may be generated at a faster rate when the efficiency of the heat exchanger is increased. The life of the heat exchanger may also be increased as the operating efficiency of the heat exchanger is improved. Accordingly, there is a need for an improved heat exchanger for use in the operation of a steam generator of a steam cooking device. The present invention has been designed to fulfill this need.

The present invention provides a steam cooking device comprising a steam generating chamber having a steam generator including a heat exchanger, a cooking chamber adjacent to the steam generating chamber for receiving steam from the steam generator, the cooking chamber including top and bottom walls, a rear wall and opposite side walls and means in one or more of the walls for introducing steam into the cooking chamber.

The present invention provides a heat exchanger within the steam generator portion of the cooking device. The heat exchanger of the present invention includes metal panels having raised surface projections thereon which create turbulence in flue gas flow through the passageways of the heat exchanger, which assists in heat distribution throughout the steam generator portion of the cooking device. The raised surface projections also serve as spacers so that the heat exchanger panels will not be able to close up during operation due to a bowing effect that sometimes results from the cold water in the steam generator chamber and the heat from the flue gases.

Other principle features and advantages of the present invention will become apparent to those skilled in the art upon review of the following Detailed Description, claims, and drawings.

Figure 1:
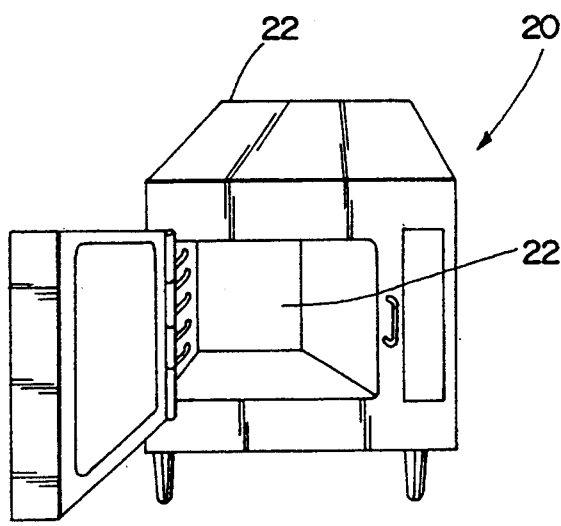
FIG. 1 is a perspective view of a steam cooking device of the present invention.

Before a preferred embodiment of the present invention is explained in greater detail, it is to be understood that the present invention is not limited in its application to the details of construction and the arrangement of components set forth in the following description or illustrated in the drawings. The invention is capable of other embodiments and being practiced or being carried out in various ways. Also, it should be understood that the phraseology and terminology used herein is for the purpose of description and should not be regarded as limiting.

DESCRIPTION OF THE PREFERRED EMBODIMENT(S)

Referring now to the drawings, and particularly FIG. 1, a steam cooking device 20 embodying the present invention is illustrated. The steam cooking device 20 includes a steam generating chamber 22 having a means for providing heat, to heat water contained in the steam generating chamber to cause the water to turn to steam.

Figure 2:
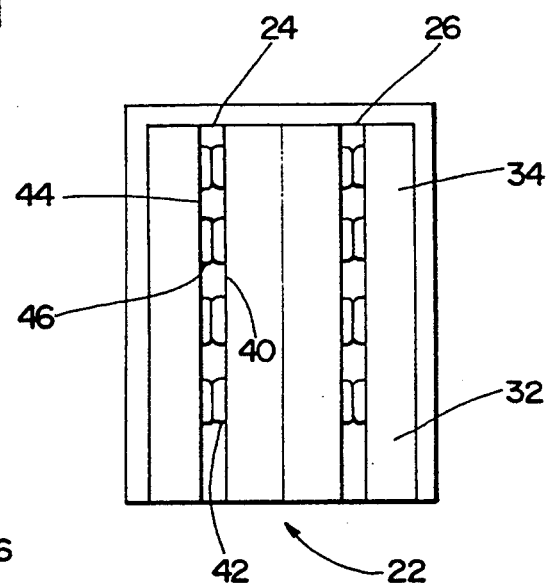
FIG. 2 is a view inside the steam generator heat exchanger from the ignitor or burner end of the steam generator with the ignitor or burner not shown.
Figure 3:
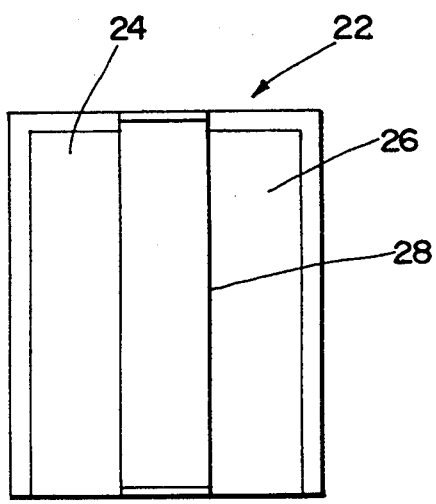
FIG. 3 is the view of FIG. 2 showing the ignitor or burner in its relationship with the steam generator.
Figure 4:
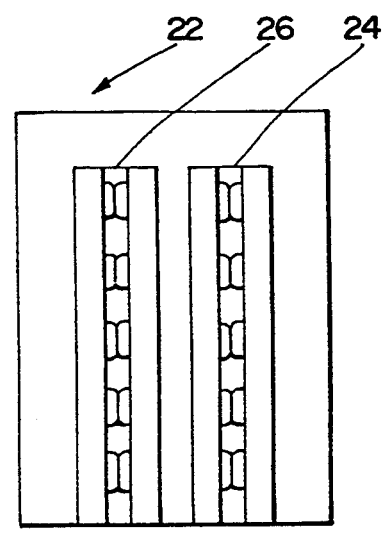
FIG. 4 is an end view of the steam generator from the flue gas exit end of the steam generator.
Figure 5:
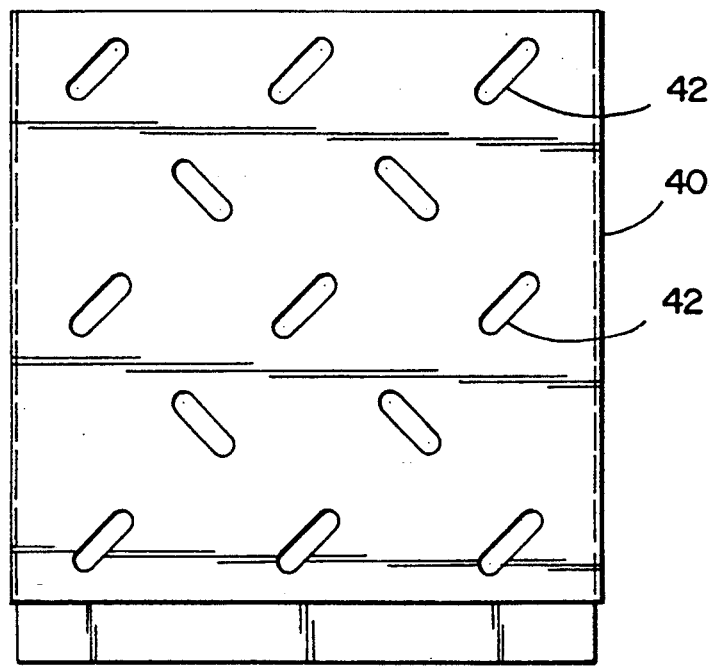
FIG. 5 is a plane view of the heat exchanger inner panel.
Figure 6:
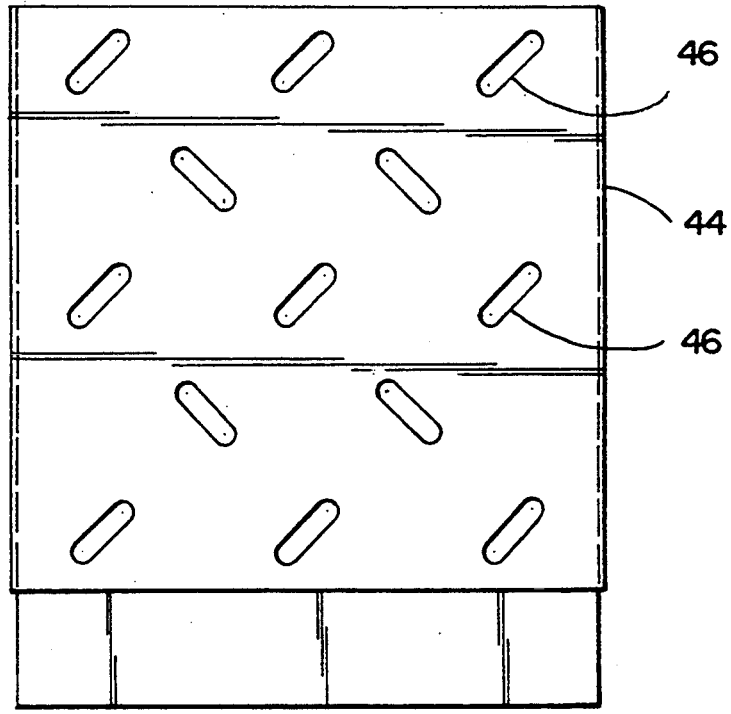
FIG. 6 is a plane view of the heat exchanger outer panel.
Figure 7:
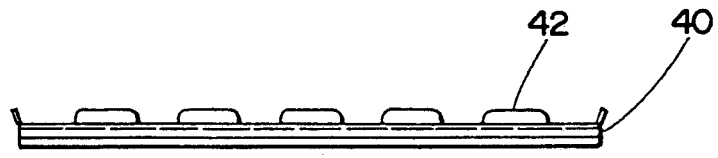
FIG. 7 is an end view of the heat exchanger inner panel.
Figure 8:
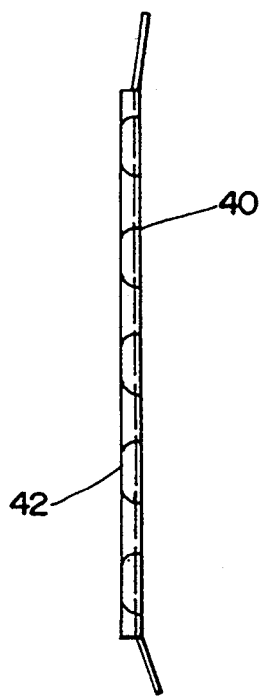
FIG. 8 is a side view of the heat exchanger inner panel.
Figure 10:
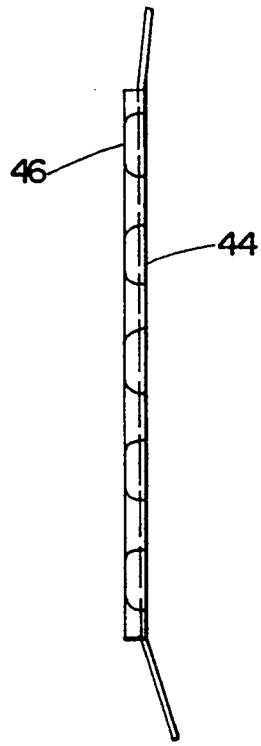
FIG. 10 is a side view of the heat exchanger outer panel.

Referring now to FIG. 2, a steam generator chamber is shown. In this preferred embodiment, the steam generating chamber is separated into two halves. The first half or first heating zone 24 is preferably spaced apart a predetermined distance from a second heating zone 26 of the steam generating chamber 22. FIG. 3 shows the physical association between the first and second heating zones 24, 26 and the burner 28. In this preferred embodiment, the burner is a gas burner that is ignited to cause a flame which sends flue gases through the first heating zone 24 and second heating zone 26. FIG. 4 shows the exit end of the steam generator chamber 22 where the flue gases exit the first and second zones 24, 26.

FIG. 4 also reveals the remaining portions of the steam generator chamber 22. The outer walls surrounding the first and second heating zones 24, 26 provide space in which water may reside to be heated by the flue gases passing through the heating zones 24, 26. These spaces 30 inside the walls of the steam generator 22 will generally contain water in the lower portion 32 thereof and as the water is heated, steam will rise to the upper portion 34 of the spaces 30. One or more nozzles 36 may be in contact with the steam generator chamber 22 to allow the steam in the upper portion 34 of the chamber 22 to pass into the cooking chamber 38 of the cooking device 20.

Figure 11:
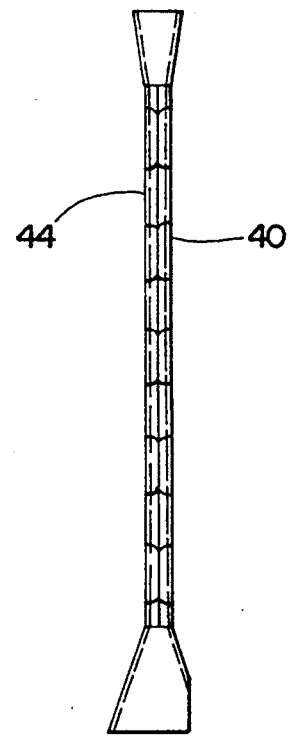
FIG. 11 is a side view of the heat exchanger inner and outer panel assembly of the present invention.
Figure 9:
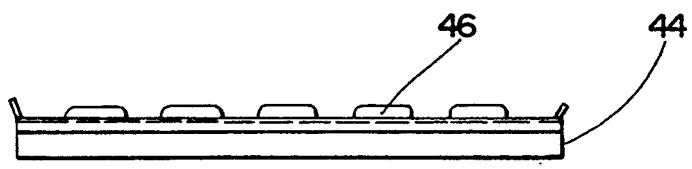
FIG. 9 is an end view of the heat exchanger outer panel.

FIGS. 5-11 show the pieces and construction of the first heating zone 24 of the present invention. An inner panel 40 is preferably made of a metal such as stainless steel. The panel is preferably thin in cross section having raised surface projections 42 and integrally formed therein. The raised surface projections 42 are preferably arranged on the surface of the panel 40 in a series of rows. The surface projections 42 are preferably staggered so that any two adjacent rows of projections 42 are offset by approximately 45° from the nearest projection in any adjacent row. Additionally, the projections in any row are preferably oval in shape and are rotated approximately 45° from vertical. The projects in any adjacent row are preferably rotated 45° from vertical in the opposite direction. The outer panel 44 shown in FIG. 6 preferably has raised surface projections 46 which are a mirror image of the raised surface projections 42 of the inner panel 40. FIG. 11 shows the assembly of the inner panel 40 with the outer panel 44 creating the first heating zone 24 of the heat exchanger of the steam generator chamber 22 of the present invention. A substantially identical second heating zone is also preferably provided.

As the gas from the burner 28 is ignited, flue gases begin to rise through the first and second heating zones 24, 26. The raised surface projections 42, 46 within the heat exchanger cause the flue gases to pass through the heating zones in a turbulent flow. The turbulence of the flue gases induced by the raised surface projections causes more even heat distribution throughout the steam generator chamber 22 which causes the water to turn to steam in a faster time. The raised surface projections also benefit the heat exchanger by preventing the walls of the heating zones from warping or bowing due to the great temperature variations that occur in the walls of the heat exchanger over the course of usage of the steam generator. The raised surface projections literally prevent the walls of the heating zones from closing in, which would obstruct flow of the flue gases and thereby decrease efficiency of the heating process.

The physical relationship between the burner 28 and the entrance to the first and second heating zones 24, 26 enables the present invention to capture more of the heat from the burner very quickly and to distribute the flue gases through the respective heating zones. By capturing more of the heat from the burner and by efficiently distributing the heat through the heating zones due to the raised surface projections causing turbulent flow, the present invention is more efficient in that it uses less heat, and therefore less energy to achieve steam for the purpose of cooking food in the present invention.

What is claimed is:

1. A steam cooking device comprising:
    a steam generating chamber having a steam generator;
    a cooking chamber adjacent to said steam generating chamber for receiving steam from said steam generator;
    a heat exchanger secured within said steam generator, said heat exchanger including at least one heating zone comprised of an inner panel having raised surface projections thereon, an outer panel having raised surface projections thereon, and a path between said raised surface projections whereby flue gases may pass for heating the walls of the heat exchanger.

2. The steam cooking device of claim 1, wherein said raised surface projections are arranged in a plurality of rows whereby the raised surface projections in any row are offset from the raised surface projections in any adjacent row.

3. The cooking device of claim 1, further comprising:
    a second heating zone adjacent said first heating zone within said steam generating chamber.

4. A steam cooking device comprising:
    a steam generating chamber;
    a cooking chamber adjacent to said steam generating chamber for receiving steam from said steam generating chamber;
    a burner in association with said steam generating chamber;
    a heat exchanger within said steam generating chamber, said heat exchanger adapted to receive flue gases created by said burner; a place outside of said heat exchanger and inside said steam generating chamber for holding water such that said water is in contact with an outside surface of said heat exchanger.

5. The cooking device of claim 4, wherein said heat exchanger includes at least one surface having raised surface projections thereon.

6. The cooking device of claim 5, wherein said raised surface projections are arranged in a manner to disrupt laminar flow of flue gases through the heat exchanger.

7. The cooking device of claim 5, wherein at least one of said raised surface projections contacts a projection on an opposing side of said heat exchanger thereby maintaining a controlled space between opposing sides of said heat exchanger.

* * * * *